United States Patent
Ikeda

[11] 4,210,388
[45] Jul. 1, 1980

[54] LARGE-APERTURE WIDE-ANGLE LENS SYSTEM FOR PHOTOGRAPHIC CAMERAS

[75] Inventor: Yoshitsugi Ikeda, Hachiouji, Japan

[73] Assignee: Olympus Optical Company Limited, Tokyo, Japan

[21] Appl. No.: 884,544

[22] Filed: Mar. 8, 1978

[30] Foreign Application Priority Data

Mar. 14, 1977 [JP] Japan .................. 52/27700

[51] Int. Cl.² ............................................ G02B 9/64
[52] U.S. Cl. .................................... 350/214; 350/207
[58] Field of Search .............. 350/214, 176, 205, 206, 350/207

[56] References Cited

U.S. PATENT DOCUMENTS

| 1,764,870 | 6/1930 | Hartinger | 350/207 X |
| 2,894,427 | 7/1959 | Sabater | 350/205 X |
| 3,843,235 | 10/1974 | Mino et al. | 350/205 |
| 3,970,366 | 7/1976 | Sekiguchi | 350/207 X |

FOREIGN PATENT DOCUMENTS 2504328  8/1975  Fed. Rep. of Germany ........... 350/214

Primary Examiner—Paul A. Sacher
Attorney, Agent, or Firm—Cushman, Darby & Cushman

[57] ABSTRACT

A large-aperture wide-angle lens system for photographic cameras with corrected flare due to coma of marginal pencil comprising a flare stop arranged in the vicinity of an intersecting point between the maximum aperture ray of paraxial pencil and the outermost ray of offaxial pencil directing to the marginal portion of image.

7 Claims, 15 Drawing Figures

Y₂=21.6 mm

Y₁=8.6 mm

Y₁=8.6 mm

LARGE-APERTURE WIDE-ANGLE LENS SYSTEM FOR PHOTOGRAPHIC CAMERAS

BACKGROUND OF THE INVENTION (a) Field of the Invention

The present invention relates to a retrofocus type large-aperture wide-angle lens system for photographic cameras, and more specifically to a lens system comprising a flare stop serving to limit flare due to coma of offaxial oblique pencil which is likely to be produced in photographing at the maximum aperture.

(b) Description of the Prior Art

In conventional retrofocus type large-aperture wide-angle lens systems, effective aperture of the offaxial oblique pencils was larger than the effective diameter of the paraxial maximum aperture on the incidence side. Therefore, it was impossible to limit flare due to coma with the effective aperture of the lens systems alone when the aperture stop was used in open condition. This phenomenon is apt to occur especially in lens systems having short total lengths and unavoidably degrades quality of photographed images.

SUMMARY OF THE INVENTION

A general object of the present invention is to provide a large-aperture wide-angle lens system for photographic cameras comprising a flare stop which limits flare due to coma by limiting the offaxial oblique pencil.

An ordinary retrofocus type large-aperture wide-angle lens system consists, as shown in FIG. 1, a front diverging lens group $L_1$, a front converging lens group $L_2$ and a rear converging lens group $L_3$. An aperture stop S is arranged in the airspace formed between the front converging lens group $L_2$ and the rear converging lens group $L_3$. Of the effective pencils passing through the lens system, the paraxial pencil directing to the center $y_0$ of image has a maximum aperture ray $l_0$ (paraxial ray allowed to pass by the maximum aperture stop) whose position is determined by the stop S. The marginal pencil (offaxial pencil corresponding to the marginal portion $y_2$ of the image) has a lowest ray $l_2$ whose position is determined by the aperture of the front lens group. In a large-aperture wide-angle lens system, the effective aperture of the front lens group is therefore determined by the ray $l_2$ of the marginal oblique pencil rather than the paraxial pencil.

In such a large-aperture wide-angle lens system, however, quantity of the rays of the pencil which passes within the range of the effective aperture to reach an intermediate portion $y_1$ of image is generally larger than required. In an extreme case, aperture efficiency may exceed 100% as indicated by curve (1) in FIG. 2 when the aperture stop is opened. This phenomenon is likely to occur especially in a lens system having a short total length, in which flare due to coma will be aggravated by excessive quantity of lower rays of the offaxial pencil as shown in FIG. 3A. In order to reduce flare due to coma, it is therefore necessary to limit incidence of the lower rays to such a degree as shown in FIG. 3B. However, such a measure will unavoidably degrades the aperture efficiency as shown in FIG. 3B. Hence, it is desired to reduce flare due to coma while controlling degradation in aperture efficiency to the possible minimum level, but it will be impossible to satisfy such a desire simply by minimizing the effective aperture of a lens system.

The lens system according to the present invention is characterized in that it comprises a flare stop E which is arranged in the vicinity of the intersecting point between the ray $l_0$ of the paraxial pencil and the lowest ray $l_2$ of the marginal oblique pencil, and has an effective aperture equal to the distance as measured from the optical axis to said intersecting point. In other words, the stop E serves for interrupting the lowest ray $l_1$ of the zonal oblique pencil directing to the intermediate image portion $y_1$, thereby passing lower ray 1 while interrupting excessive ray. If the stop E is arranged on the object side of the intersecting point between the rays $l_0$ and $l_2$, ray $l_2$ of the marginal oblique pencil is interrupted, resulting in remarkable insufficiency in quantity of the marginal rays. If the stop is arranged on the image side of the intersecting point between the rays $l_0$ and $l_2$, in contrast, the paraxial pencil will be interrupted, thereby reducing the aperture ratio. The vicinity of said intersecting point is the position optimum for arranging said stop and most effective for limiting flare due to coma without aggravating other aberrations.

However, a large-aperture wide-angle lens system must comprise a large number of lens components and have a short total length, within which airspace is naturally limited. It is therefore impossible in most cases to arrange the flare stop E in an airspace. From the viewpoints of machining precision and effective aperture, it is also impossible to manufacture very thin lens components. Therefore, the intersecting point between the rays $l_0$ and $l_2$ is located, in relatively numerous cases, within a lens component belonging to the front converging lens group $L_2$ as shown in FIG. 4, thereby making it impossible to arrange the stop E at its optimum position. This problem can be solved by dividing said lens component into two elements in the vicinity of the intersecting point between the rays $l_0$ and $l_2$, and arranging said stop E in the airspace formed by dividing said lens component. In such a case, said lens component should preferably be so divided as not to aggravate aberrations and so as to facilitate to arrange said stop E. The lens elements formed by dividing said lens component and arranged on both sides of said stop E may have flat or curved surfaces having large radii of curvature r and r' which may be equal or different and refractive indices which may be equal or different.

The stop E may not be arranged in airspace formed between two separate lens elements. Speaking concretely, the stop E can be arranged as a thin ring-shaped stop E fitted between the surfaces r and r' which are cemented after splitting.

DETAILED DESCRIPTION OF THE PREFERRED EMBODIMENTS

Figure 1:
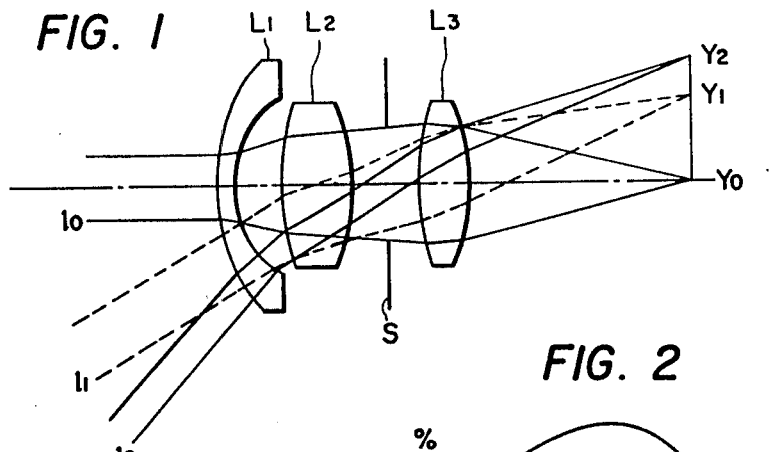
FIG. 1 shows a diagram for illustrating the fundamental composition of a retrofocus type wide-angle lens system for describing the principle of the present invention.
Figure 2:
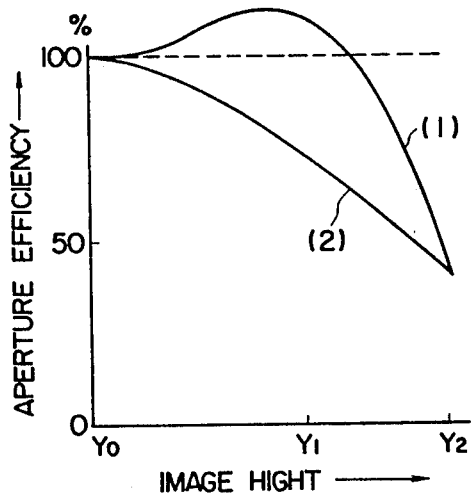
FIG. 2 shows a diagram illustrating aperture efficiency as a function of image height.
Figure 3A:
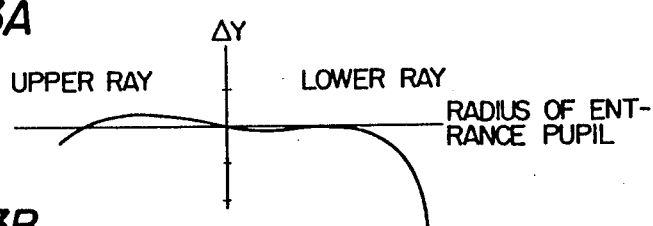
FIG. 3A shows a curve illustrating coma characteristic of a lens system in which the lower pencil is not limited.
Figure 3B:
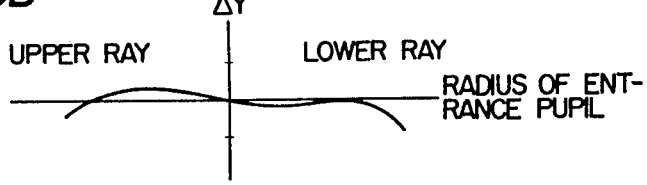
FIG. 3B illustrates a curve illustrating coma characteristic of the lens system in which the lower pencil is limited.
Figure 4:
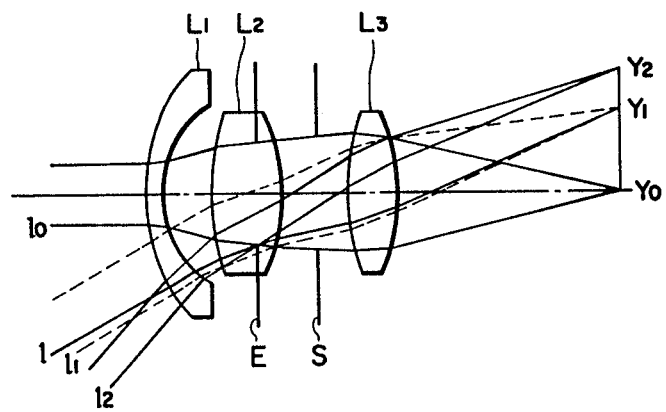
FIG. 4 shows diagram illustrating the principle to determine the position to arrange the flare stop in the lens system according to the present invention.
Figure 5:
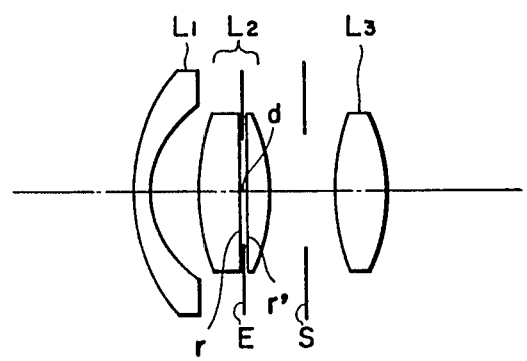
FIG. 5 and 6 show diagrams illustrating examples of manners to arrange said flare stop in the lens system.
Figure 6:
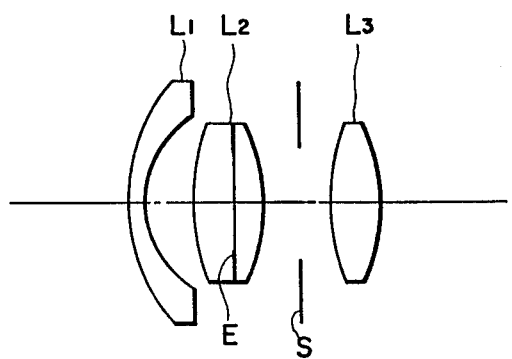
Figure 7:
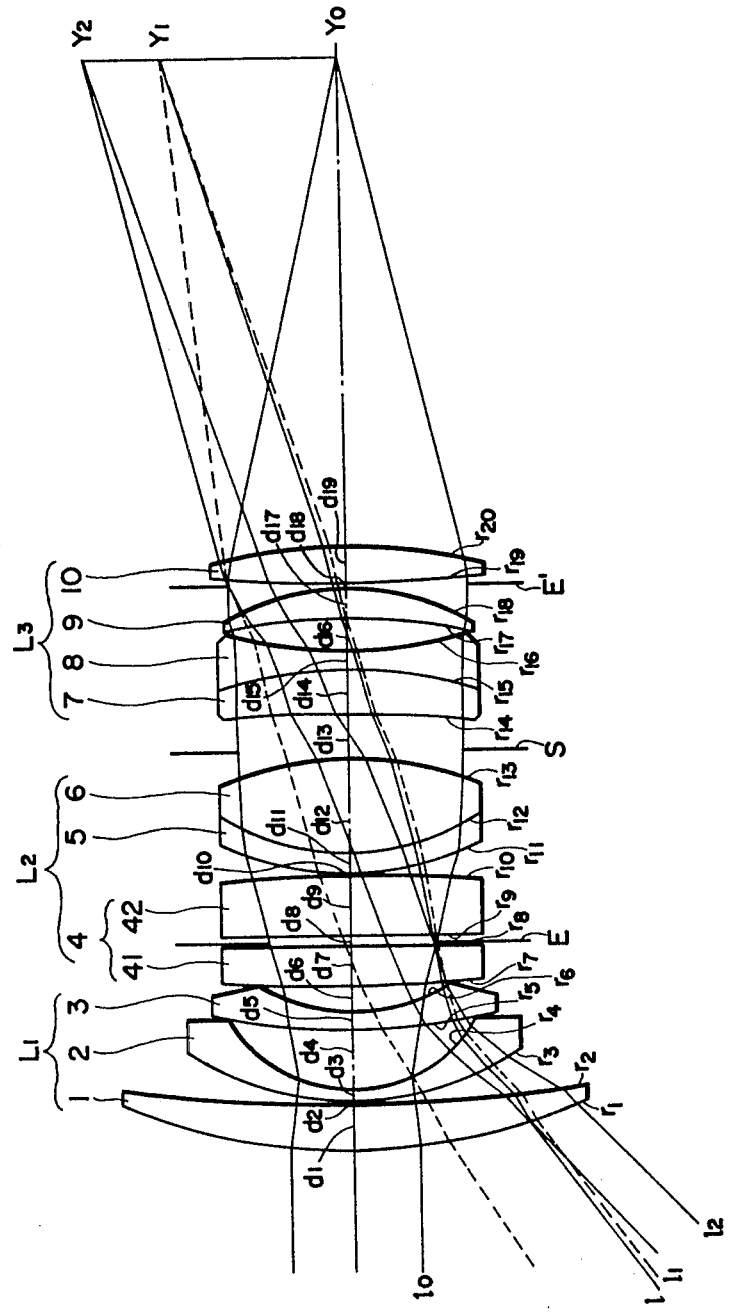
FIG. 7 illustrates a diagram showing the composition of a preferred embodiment of the present invention.

A preferred embodiment of the large-aperture wide-angle lens system for photographic cameras has such a composition as shown in FIG. 7. That is to say, the lens system consists of eight components of ten lens elements and has the following numerical data:

$f = 100$
Aperture ratio: 1:2
Field angle: 92°

| | | | |
|---|---|---|---|
| $r_1 = 205.67$ | | | |
| | $d_1 = 18.60$ | $n_1 = 1.639$ | $\nu_1 = 44.9$ |
| $r_2 = 529.30$ | | | |
| | $d_2 = 0.60$ | | |
| $r_3 = 101.53$ | | | |
| | $d_3 = 6.28$ | $n_2 = 1.734$ | $\nu_2 = 51.5$ |
| $r_4 = 52.977$ | | | |
| | $d_4 = 23.26$ | | |
| $r_5 = 227.95$ | | | |
| | $d_5 = 5.63$ | $n_3 = 1.7725$ | $\nu_3 = 49.6$ |
| $r_6 = 62.233$ | | | |
| | $d_6 = 10.70$ | | |
| $r_7 = 640.47$ | | | |
| | $d_7 = 15.86$ | $n_4 = 1.61659$ | $\nu_4 = 36.6$ |
| $r_8 = \infty$ | | | |
| | $d_8 = 3.26 = d$ | | |
| $r_9 = \infty$ | | | |
| | $d_9 = 23.26$ | $n_5 = 1.61659$ | $\nu_5 = 36.6$ |
| $r_{10} = -2015.3$ | | | |
| | $d_{10} = 0.47$ | | |
| $r_{11} = 110.65$ | | | |
| | $d_{11} = 6.98$ | $n_6 = 1.6968$ | $\nu_6 = 55.5$ |
| $r_{12} = 68.419$ | | | |
| | $d_{12} = 36.28$ | $n_7 = 1.5934$ | $\nu_7 = 34.8$ |
| $r_{13} = -170.19$ | | | |
| | $d_{13} = 17.67$ | | |
| $r_{14} = -1046.5$ | | | |
| | $d_{14} = 17.58$ | $n_8 = 1.72$ | $\nu_8 = 43.7$ |
| $r_{15} = -88.372$ | | | |
| | $d_{15} = 6.98$ | $n_9 = 1.84666$ | $\nu_9 = 23.9$ |
| $r_{16} = 212.47$ | | | |
| | $d_{16} = 10.00$ | | |
| $r_{17} = 232.47$ | | | |
| | $d_{17} = 13.95$ | $n_{10} = 1.713$ | $\nu_{10} = 53.9$ |
| $r_{18} = -88.093$ | | | |
| | $d_{18} = 0.47$ | | |
| $r_{19} = 459.95$ | | | |
| | $d_{19} = 13.95$ | $n_{11} = 1.72$ | $\nu_{11} = 50.2$ |
| $r_{20} = 199.86$ | | | | wherein the reference symbols $r_1$ through $r_{20}$ represent radii of curvature on the respective surfaces of said lens elements, the reference symbols $d_1$ through $d_{19}$ designate the respective thicknesses of said lens elements and airspaces formed therebetween, the reference symbols $\nu_1$ through $\nu_{11}$ denote Abbe's numbers of the respective lens elements and the reference symbol f represents the total focal length of the lens system as a whole.

Figure 8A:
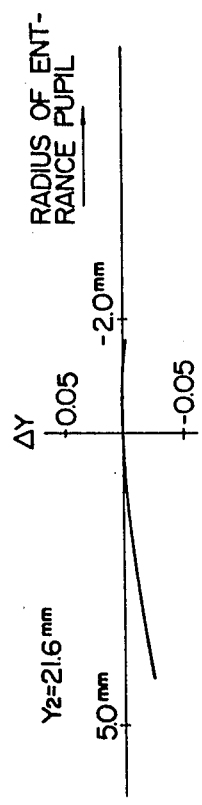
FIG. 8A and 8B illustrate graphs showing coma characteristic of said embodiment when it does not comprise said flare stop.
Figure 8B:
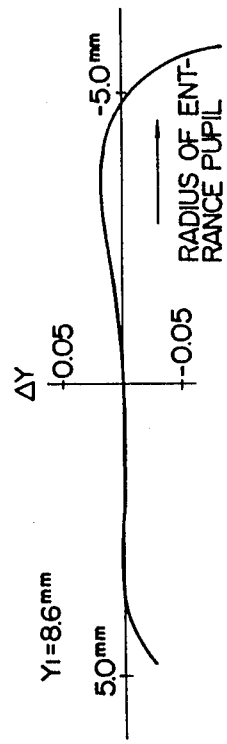
Figure 8C:
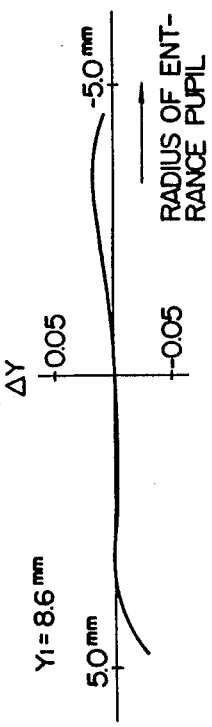
FIG. 8C illustrates a graph showing the coma characteristic of said lens system when it comprises said flare stop.
Figure 9:
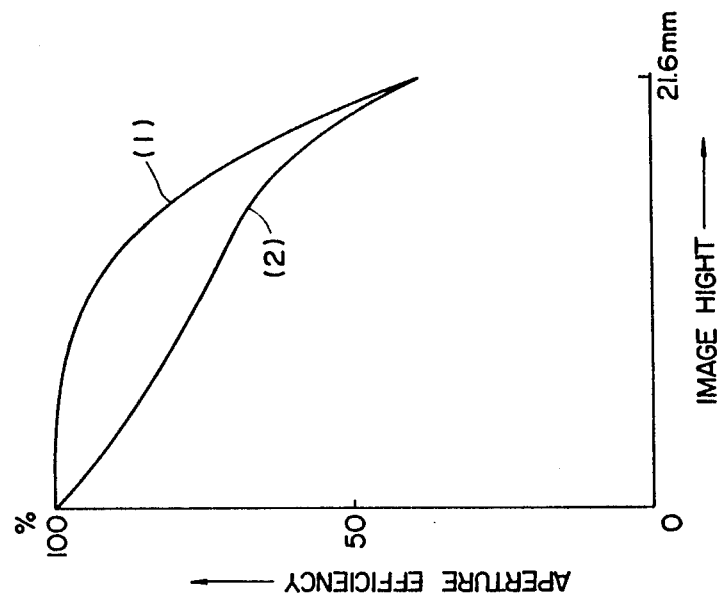
FIG. 9 illustrates a graph showing aperture efficiency as a function of image height.
Figure 10A:
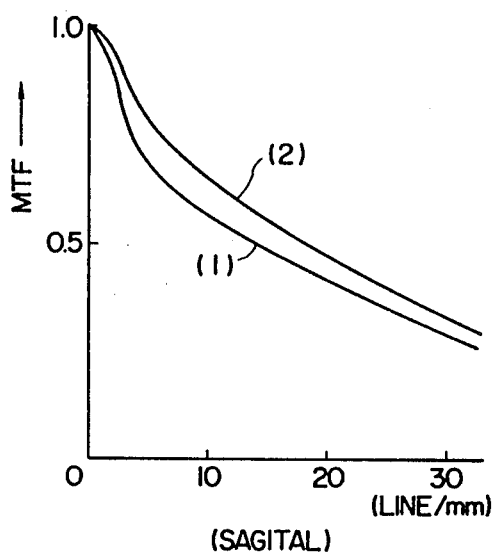
FIG. 10A shows graphs illustrating MTF of the sagital image surface at an intermediate portion of an image obtained by said embodiment.
Figure 10B:
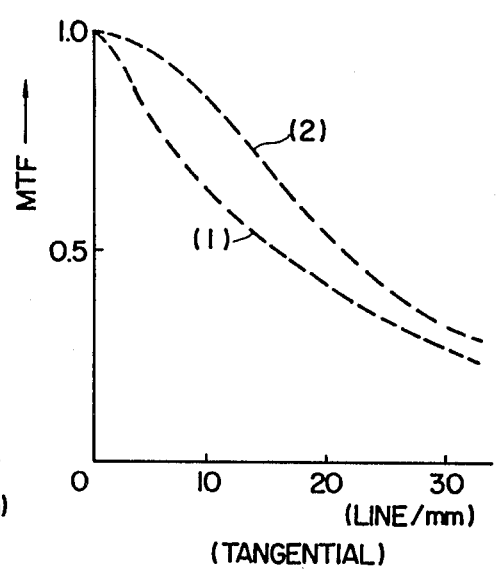
FIG. 10B shows a graph illustrating MTF of the tangential image surface at intermediate portion of an image obtained by said embodiment.
Figure 11:
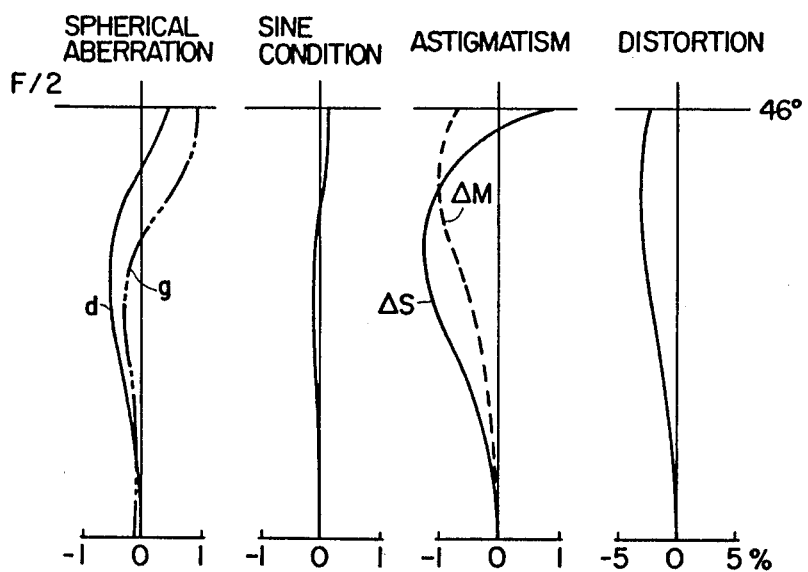
FIG. 11 shows a aberration curves of said embodiment.

This lens system comprises a front diverging lens group $L_1$ comprising a first lens component 1, a second lens component 2 and a third lens component 3, a front converging lens group $L_2$ comprising a fourth lens component 4 and a fifth lens component 5, 6, and a rear converging lens group $L_3$ comprising a sixth lens component 7, 8, a seventh lens component 9 and an eighth lens component 10. In this lens system, the flare stop E is arranged in the airspace d which is formed by dividing the lens component 4 along a flat plane into two lens elements 41 and 42 since the ray $l_0$ of the paraxial pencil intersects with the ray $l_2$ within the fourth lens component 4 of the front converging lens group. The variation in coma obtained by the stop E arranged as described above is illustrated in FIG. 8A, FIG. 8B and FIG. 8C respectively. FIG. 8A shows coma at marginal portion of the image formed with said lens system. FIG. 8B illustrates coma which is aggravated when the lens system does not comprise the stop E. FIG. 8C shows coma which is corrected when the ray $l_1$ directing to the intermediate portion $y_1$ of the image is limited to the ray 1 by arranging the stop E in said lens system. FIG. 9 compares aperture efficiency between case (1) where the stop E is not arranged and case (2) where the stop E is arranged in said lens system. From these figures, it will be clearly understood that the aperture efficiency is not degraded so remarkably at the intermediate portion of the image. Image contrast at the intermediate portion $y_1$ of the image is illustrated in FIG. 10A and FIG. 10B respectively. The curve (1) corresponds to a case where said lens system does not comprise the stop E and curve (2) corresponds to a case where the stop E is arranged in said lens system. As is clear from these curves, the stop E can effectively improve image contrast in low-frequency region. Especially on the tangential image plane, contrast is remarkably improved as shown in FIG. 10B.

As is proved by the foregoing descriptions, flare due to coma can be sufficiently corrected by the stop E though the ray $l_1$ of the zonal oblique pencil directing to the intermediate portion $y_1$ of the image is limited only slightly to the ray 1 by said stop E. It will therefore be understood that remarkable effect is obtainable with the stop E which is arranged in the vicinity of the intersecting point between the ray $l_0$ of the paraxial pencil and the lower ray $l_2$ of the marginal oblique pencil.

Further, it will be possible to correct flare due to coma of the upper ray of the oblique pencil directing to the marginal portion of the image by the means similar to that for correcting flare due to coma of the lower ray. In other words, flare due to coma of the upper ray of the marginal oblique pencil can be limited by arranging a flare stop E' having an effective radius equal to the distance as measured from the optical axis to the intersecting point between the maximum aperture ray of paraxial pencil and upper ray of the marginal pencil at a position in the vicinity of said intersecting point.

I claim:

1. A retrofocus type large-aperture wide-angle lens system for photographic cameras comprising a front diverging lens group, a middle converging lens group, a rear converging lens group, an aperture stop arranged between said middle converging lens group and said rear converging lens group and a flare stop which is arranged in the middle converging lens group before said aperture stop and in the vicinity of the intersecting point between the maximum aperture ray of the paraxial pencil among the rays passing through the lens system and the outermost ray of the offaxial pencil directing to the marginal portion of image and has an effective radius equal to the distance as measured from the optical axis to said intersecting point.

2. A large-aperture wide-angle lens system according to claim 1 wherein said flare stop is arranged in an airspace formed by dividing the lens component located at the position to arrange said stop into two lens elements.

3. A large-aperture wide-angle lens system for photographic cameras according to claim 2 wherein said flare stop is fitted between the two lens elements which are cemented to each other.

4. A large-aperture wide-angle lens system for photographic cameras according to claim 2 wherein said two lens elements have flat surfaces.

5. A large-aperture wide-angle lens system for photographic cameras according to claim 2 wherein said two lens elements have curved surfaces with large radii of curvature.

6. A retrofocus type large-aperture wide-angle lens system for photographic cameras according to claim 1 wherein an additional flare stop is arranged in said rear converging lens group.

7. A large-diameter wide-angle lens system for photographic cameras comprising a first positive meniscus lens component, a second negative meniscus lens component, a third negative meniscus lens component, a fourth lens component divided into two elements, a fifth positive cemented lens component, a sixth negative cemented lens component, a seventh positive meniscus lens component, an eighth positive lens component and a flare stop arranged between the two elements of said fourth lens component, and said lens system having the following numerical data:

$f = 100$

| Aperture ratio: | 1:2 | | |
|---|---|---|---|
| Field angle: | 92° | | |
| $r_1 = 205.67$ | | | |
| | $d_1 = 18.60$ | $n_1 = 1.639$ | $v_1 = 44.9$ |
| $r_2 = 529.30$ | | | |
| | $d_2 = 0.60$ | | |
| $r_3 = 101.53$ | | | |
| | $d_3 = 6.28$ | $n_2 = 1.734$ | $v_2 = 51.5$ |
| $r_4 = 52.977$ | | | |
| | $d_4 = 23.26$ | | |
| $r_5 = 227.95$ | | | |
| | $d_5 = 5.63$ | $n_3 = 1.7725$ | $v_3 = 49.6$ |
| $r_6 = 62.233$ | | | |
| | $d_6 = 10.70$ | | |
| $r_7 = 640.47$ | | | |
| | $d_7 = 15.86$ | $n_4 = 1.61659$ | $v_4 = 36.6$ |
| $r_8 = \infty$ | | | |
| | $d_8 = 3.26 = d$ | | |
| $r_9 = \infty$ | | | |
| | $d_9 = 23.26$ | $n_5 = 1.61659$ | $v_5 = 36.6$ |
| $r_{10} = -2015.3$ | | | |
| | $d_{10} = 0.47$ | | |
| $r_{11} = 110.65$ | | | |
| | $d_{11} = 6.98$ | $n_6 = 1.6968$ | $v_6 = 55.5$ |
| $r_{12} = 68.419$ | | | |
| | $d_{12} = 36.28$ | $n_7 = 1.5934$ | $v_7 = 34.8$ |
| $r_{13} = -170.19$ | | | |
| | $d_{13} = 17.67$ | | |
| $r_{14} = -1046.5$ | | | |
| | $d_{14} = 17.58$ | $n_8 = 1.72$ | $v_8 = 43.7$ |
| $r_{15} = -88.372$ | | | |
| | $d_{15} = 6.98$ | $n_9 = 1.84666$ | $v_9 = 23.9$ |
| $r_{16} = 212.47$ | | | |
| | $d_{16} = 10.00$ | | |
| $r_{17} = 232.47$ | | | |
| | $d_{17} = 13.95$ | $n_{10} = 1.713$ | $v_{10} = 53.9$ |
| $r_{18} = -88.093$ | | | |
| | $d_{18} = 0.47$ | | |
| $r_{19} = 459.95$ | | | |
| | $d_{19} = 13.95$ | $n_{11} = 1.72$ | $v_{11} = 50.2$ |
| $r_{20} = 199.86$ | | | | wherein the reference symbols $r_1$ through $r_{20}$ represent radii of curvature on the respective surfaces of said lens components, the reference symbols $d_1$ through $d_{19}$ designate thicknesses of the respective lens components and airspaces formed therebetween, the reference symbols $n_1$ through $n_{11}$ denote refractive indices of the respective lens components and the reference symbols $v_1$ through $v_{11}$ represent Abbe's numbers of the respective lens components.

* * * * *